(12) United States Patent
Cook

(10) Patent No.: US 7,422,373 B2
(45) Date of Patent: Sep. 9, 2008

(54) SPHERICAL ROLLER BEARING SEALING ASSEMBLY

(75) Inventor: John P Cook, Bath, PA (US)

(73) Assignee: Emerson Power Transmission Manufacturing, Maysville, KY (US)

( * ) Notice: Subject to any disclaimer, the term of this patent is extended or adjusted under 35 U.S.C. 154(b) by 77 days.

(21) Appl. No.: 11/507,818

(22) Filed: Aug. 22, 2006

(65) Prior Publication Data

US 2008/0050062 A1    Feb. 28, 2008

(51) Int. Cl.
*F16C 33/76* (2006.01)
(52) U.S. Cl. .................................................... 384/486
(58) Field of Classification Search ................. 384/477, 384/478, 481, 482–486
See application file for complete search history.

(56) References Cited

U.S. PATENT DOCUMENTS

| 2,180,134 | A | * | 11/1939 | Baker et al. ................. 384/484 |
| 3,627,390 | A | * | 12/1971 | Irwin .......................... 384/478 |
| 3,881,789 | A | * | 5/1975 | Kornylak ..................... 384/482 |
| 4,792,242 | A | * | 12/1988 | Colanzi et al. .............. 384/482 |
| 5,002,406 | A | | 3/1991 | Morton et al. |
| 5,005,992 | A | * | 4/1991 | Dreschmann et al. ........ 384/484 |
| 5,419,642 | A | * | 5/1995 | McLarty ..................... 384/486 |
| 2004/0037480 | A1 | * | 2/2004 | Lee et al. .................... 384/486 |
| 2006/0274984 | A1 | * | 12/2006 | Gutowski et al. ........... 384/486 |

* cited by examiner

*Primary Examiner*—Thomas R Hannon
(74) *Attorney, Agent, or Firm*—Harness, Dickey & Pierce, P.L.C.

(57) ABSTRACT

According to the present disclosure, a sealing assembly may include a first member, a second member, and a circumferentially extending seal. The first member may include an angularly disposed running surface. The second member may be rotatable relative to the first member about an axis of rotation. The circumferentially extending seal may be coupled to the second member. The seal may include a lip having a first end fixed to the second member and a second end being generally free. The first end may form a hinge generally providing for radially outward movement of the second end relative to the axis of rotation upon rotation of said second member. The second end may be biased against the running surface.

20 Claims, 3 Drawing Sheets

SPHERICAL ROLLER BEARING SEALING ASSEMBLY

FIELD

The present disclosure relates to sealing assemblies, and more specifically to rotary sealing assemblies.

BACKGROUND

The statements in this section merely provide background information related to the present disclosure and may not constitute prior art.

Rotary seals often include rubber seal lips for sealing engagement with a structure in order to prevent migration of contaminants into a bearing assembly. During relative rotation between the seal lips and the structure engaged by the seal lips friction results in the generation of heat, which may result in sealing failure. As rotational speed increases, the friction increases as well. Additionally, use of spherical roller bearings may result in an axial and/or rotational misalignment between a structure that the rotary seal is fixed to and the structure that the rotary seal is sealingly engaged with. Current seal designs do not have a way to allow for this misalignment while maintaining a sealed relationship and not producing increased friction between a rotary seal and a structure to be sealed against.

SUMMARY

According to the present disclosure, a sealing assembly may include a first member, a second member, and a circumferentially extending seal. The first member may include an angularly disposed running surface. The second member may be rotatable relative to the first member about an axis of rotation. The circumferentially extending seal may be coupled to the second member. The seal may include a lip having a first end fixed to the second member and a second end being generally free. The first end may form a hinge generally providing for radially outward movement of the second end relative to the axis of rotation upon rotation of said second member. The second end may be biased against the running surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
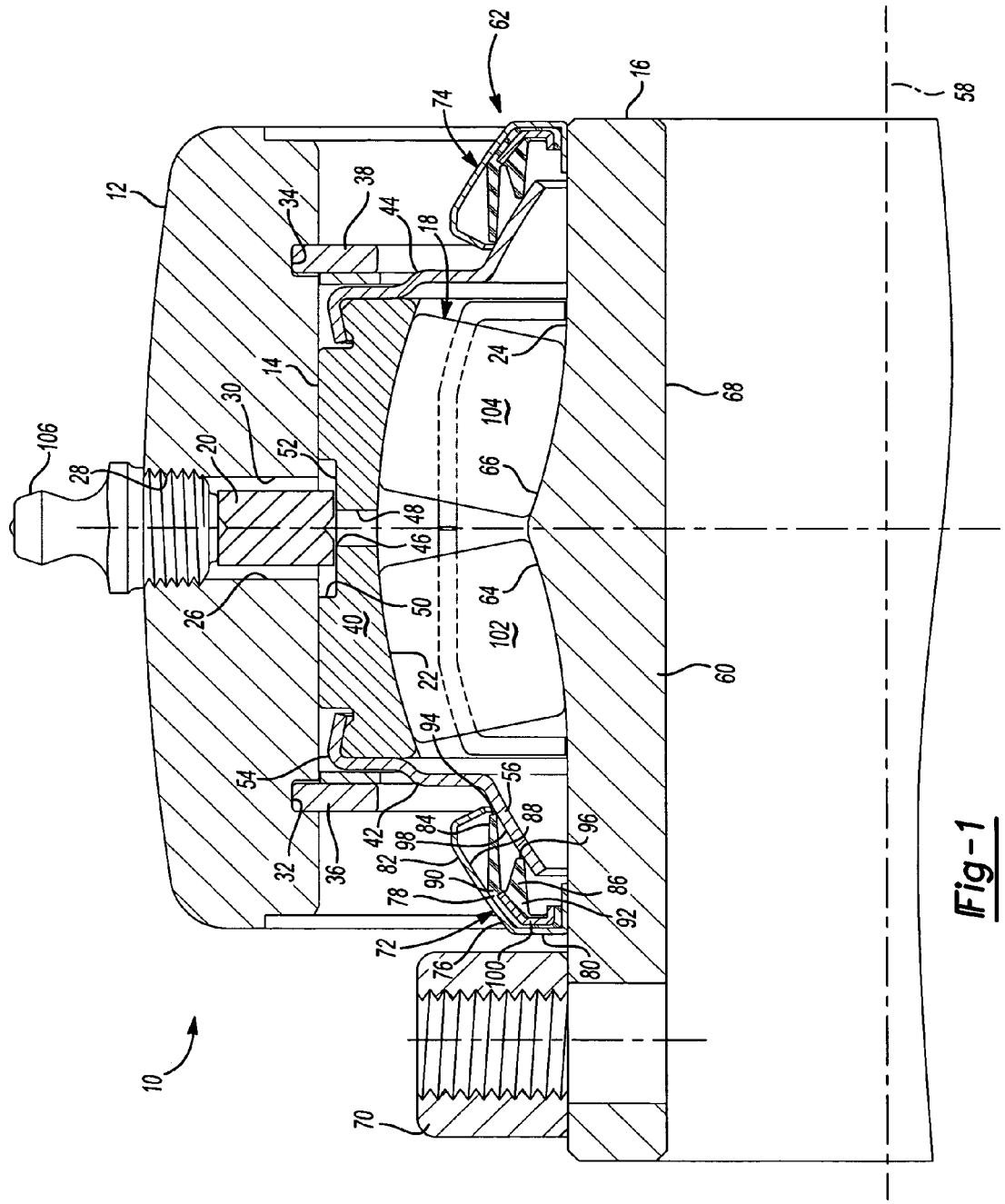
FIG. 1 is a partial sectional view of a bearing assembly according to the present disclosure.

As seen in FIG. 1, a bearing assembly 10 may include a housing 12, an outer race 14, an inner race 16, a bearing 18, and a lock pin 20. Housing 12 may extend around and generally abut a circumference of outer race 14. Housing 12 may extend around a circumference of inner race 16. Housing 12 and inner race 16 may be radially spaced apart from one another. Bearing 18 may be disposed between an inner surface 22 of outer race 14 and an outer surface 24 of inner race 16.

Housing 12 may include an aperture 26 therethrough. Aperture 26 may include an upper threaded portion 28 and a lower non-threaded portion 30. Housing 12 may further include a pair of recesses 32, 34 containing snap rings 36, 38 therein and locating outer race 14 therebetween.

Outer race 14 may include a main body portion 40 and a pair of flanges 42, 44 extending axially therefrom. Main body portion 40 may include an aperture 46 extending therethrough and generally inline with aperture 26 in housing 12. Aperture 46 may include first and second portions 48, 50. First portion 48 may have a first diameter and second portion 50 may have a second diameter. The second diameter may be greater than the first diameter, forming an annular seat 52 between first portion 48 and second portion 50. Annular seat 52 may have an inner diameter generally equal to the first diameter and an outer diameter generally equal to the second diameter. Second portion 50 may allow relative axial movement between housing 12 and outer race 14, discussed below. Inner surface 22 may be generally arcuate, or partially spherical, providing for engagement with bearing 18, discussed below.

Flanges 42, 44 may extend axially outwardly from opposite sides of main body portion 40 and may be generally similar to one another. Therefore, only flange 42 will be described with the understanding that the description applies equally to flange 44. Flange 42 may include a first portion 54 engaged with main body portion 40 and a second portion 56 extending therefrom. Second portion 56 may have an arcuate, or partially spherical, shape and may generally extend at an angle radially inwardly toward inner race 16. Second portion 56 may extend at an angle of approximately 105 degrees to 130 degrees relative to a central longitudinal axis 58. More specifically, second portion 56 may extend at an angle of approximately 120 degrees relative to central longitudinal axis 58.

Inner race 16 may be rotated about central longitudinal axis 58 during operation and may include a main body portion 60 having a sealing assembly 62 coupled thereto. Body portion 60 may include outer surface 24. Outer surface 24 may include arcuate surfaces 64, 66. Body portion 60 may further include a central bore 68 for receiving a shaft (not shown) therein and a set screw coupling 70 for fixing inner race 16 for rotation with a shaft.

Sealing assembly 62 may include first and second seals 72, 74 extending circumferentially around and fixed to outer surface 24. First and second seals 72, 74 may be generally similar to one another. Therefore, only seal 72 will be described in detail with the understanding that the description applies equally to seal 74. Seal 72 may include a bracket 76 and a sealing member 78. Bracket 76 may include a first portion 80 radially extending from outer surface 24 and a second portion 82 extending angularly from first portion 80. Second portion 82 may extend at least partially above and may be generally concentric to flange second portion 56.

Sealing member 78 may include first and second seal lips 84, 86 extending from an inner surface 88 of bracket 76. Each sealing lip 84, 86 may include a first end 90, 92 fixed to bracket 76 and a second free end 94, 96. Free ends 94, 96 may be biased against an outer surface 98 (or running surface) of flange second portion 56. Sealing member 78 may be formed from a variety of materials including elastomers and felt. Sealing member 78 may further include a bracket 100 embedded therein for additional structural support.

As discussed above, bearing 18 may be rotatably disposed between outer race 14 and inner race 16. Bearing 18 may include first and second spherical roller bearings 102, 104 rotatably engaged with outer race inner surface 22 and inner race arcuate surfaces 64, 66.

Lock pin 20 may include a cylindrical body having a diameter generally less than the diameter of aperture 26 in housing 12 and second portion 50 in outer race 14. The diameter of lock pin 20 may be greater than the diameter of first portion 48 in outer race 14. As a result, lock pin 20 may extend into aperture 26 and second portion 50 and abut annular seat 52. Lock pin 20 may travel axially within second portion 50, compensating for variation resulting from clearances between components of bearing assembly 10 and thermal expansion thereof. Lock pin 20 may be held in place by a grease fitting 106 in threaded engagement with upper threaded portion 28 of aperture 26.

Figure 3:
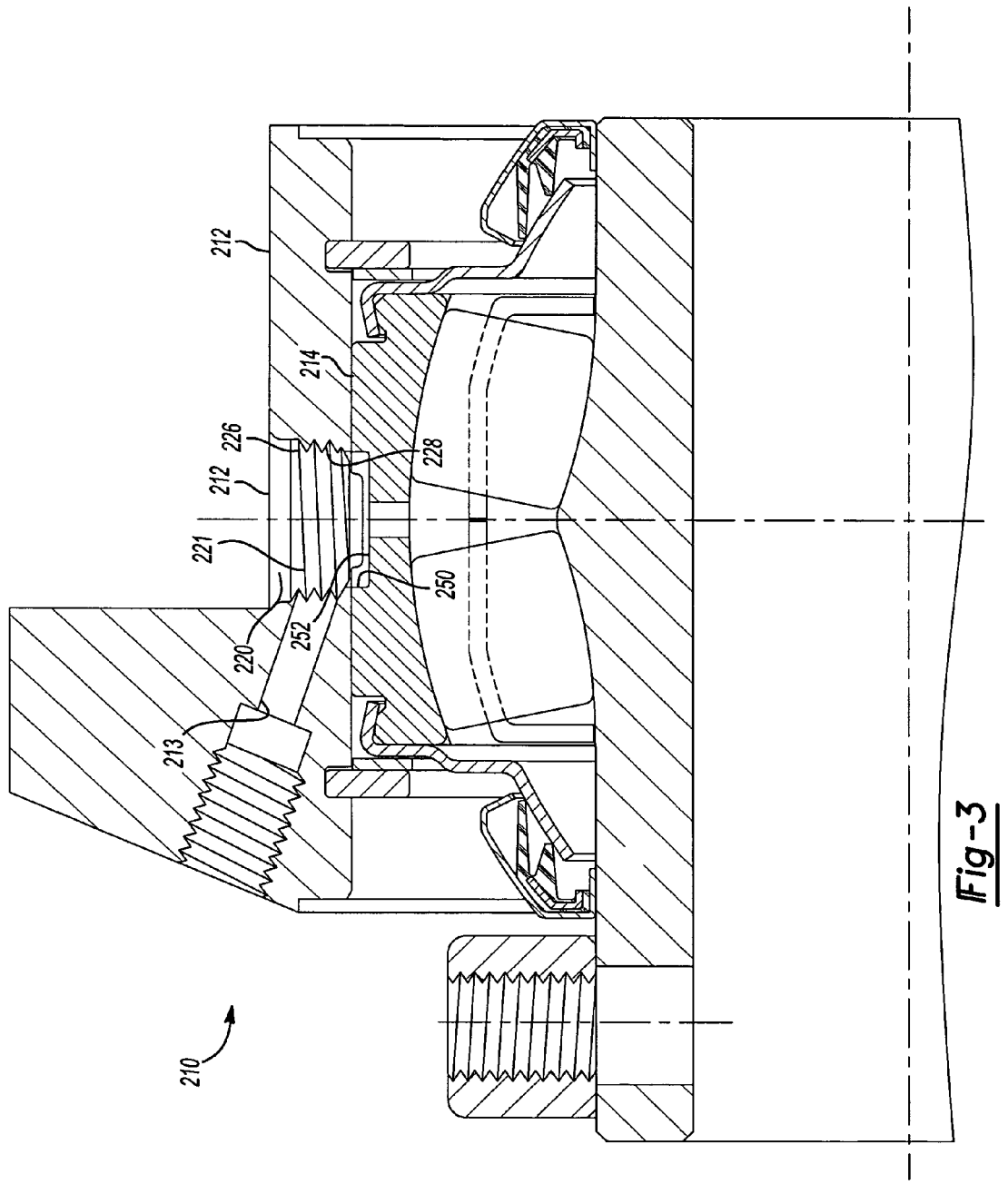
FIG. 3 is a partial sectional view of an alternate example of a bearing assembly according to the present disclosure.

An alternate bearing assembly 210 is shown in FIG. 3. Bearing assembly 210 is generally similar to bearing assembly 10, but includes a housing 212 having a reduced thickness. Therefore, similar reference numerals will be used for similar elements. A grease fitting aperture 213 may extend at an angle through housing 212 and intersect radially extending aperture 226. Due to the angular disposition of grease fitting aperture 213 relative to housing 212, lock pin 220 may retain itself within apertures 226, 250. Radially extending aperture 226 may include a threaded portion 228. Lock pin 220 may include threading 221 thereon engaged with threaded portion 228. Lock pin 220 may abut annular seat 252 in outer race 214 and may have a threaded engagement with housing 212, thereby retaining lock pin 220 in apertures 226, 250 and preventing relative rotation between housing 212 and outer race 214.

Figure 2:
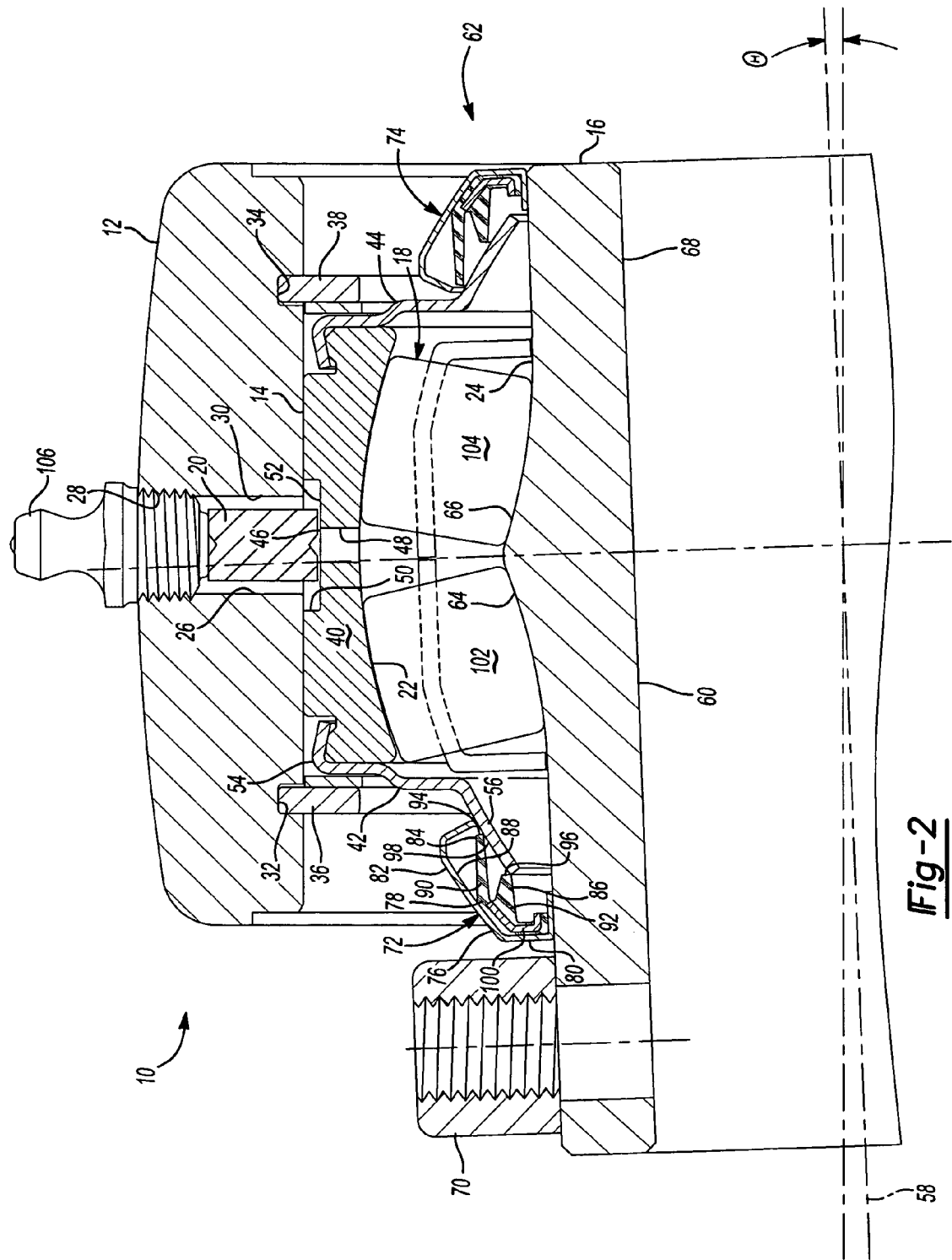
FIG. 2 is a partial sectional view of the bearing assembly of FIG. 1 in a misalignment condition.

In operation, inner race 16 may become misaligned with outer race 14 (shown in FIG. 2) for a variety of reasons including shaft bending under load, as well as thermal expansion and machine misalignment. This misalignment may result in an angular offset $\Theta$ of central longitudinal axis 58. Angular offset $\Theta$ may include a broad range of angles. In the present example, angle $\Theta$ may generally be +/−2 degrees. Sealing assembly 62 may account for this misalignment while maintaining a sealed engagement with outer race 14. Specifically, seal lip free ends 94, 96 may ride on outer surface 98 (or running surface) of flange second portion 56, thereby compensating for both angular and axial misalignment between outer race 14 and inner race 16. Additionally, as rotational speed of inner race 16 increases, seal lip free ends 94, 96 may extend radially outwardly, reducing frictional forces between outer surface 98 (or running surface) of flange second portion 56 and free ends 94, 96 as a result of centrifugal force. More specifically, when inner race 16 is not rotating, seal lip free ends 94, 96 may apply a first force against outer surface 98. When inner race 16 is rotating, seal lip free ends 94, 96 may apply a second force less than the first force against outer surface 98. As rotational speed increases, the force applied to outer surface 98 may generally decrease as a result of the centrifugal force discussed above.

While the above description constitutes the present disclosure, it will be appreciated that the disclosure is susceptible to modification, variation, and change without departing form the proper scope and fair meaning of the accompanying claims.

What is claimed is:

1. A sealing assembly comprising:
    a first member including a generally convex running surface;
    a second member rotatable relative to said first member about an axis of rotation; and
    a circumferentially extending seal coupled to said second member, said seal including first and second axially spaced apart lips, each lip having a first end fixed to said second member and a second end being generally free, said first ends forming hinges generally providing for radially outward movement of said second ends relative to said axis of rotation upon rotation of said second member, said second ends maintaining continuous biased engagement with said running surface during rotation of said second member as well as during axial alignment and misalignment of said first and second members.

2. The sealing assembly of claim 1, wherein said running surface is disposed at an angle of between 105 and 130 degrees relative to said axis of rotation.

3. The sealing assembly of claim 1, wherein said first member includes an outer race fixed to a flange, said flange including said running surface at one end and a substantially axially extending cup portion at an opposite end, said cup portion having a reduced diameter at a distal end to engage an undercut formed in said outer race.

4. The sealing assembly of claim 1, wherein each of said lip second ends applies a first force against said running surface when said second member is not rotating, said lip second ends applying a second force against said running surface when said second member is rotating, said second force being generally less than said first force.

5. The sealing assembly of claim 1, further comprising a spherical roller bearing disposed between said first and second members.

6. The sealing assembly of claim 1, wherein said first member includes an outer race and said second member includes an inner race.

7. The sealing assembly of claim 1, wherein said second member includes a cylindrically shaped first portion adapted to engage an inner bearing face, a radially outwardly extending second portion, a conically shaped third portion having a diameter increasing as a distance from said second portion increases and a conically shaped fourth portion having a diameter decreasing as said distance from said second portion increases.

8. The sealing assembly of claim 1, wherein said second member terminates at said fourth portion.

9. The sealing assembly of claim 1, wherein said second member includes a bracket extending generally concentric to said running surface, said seal coupled to said bracket.

10. The sealing assembly of claim 9, wherein said running surface extends radially between said bracket and said axis of rotation.

11. The sealing assembly of claim 10, wherein each of said seal lip first ends is coupled to a radially inner surface of said bracket and each of said seal lip second ends engages a radially outer portion of said running surface.

12. A sealing assembly comprising:
    an outer race including a generally spherical running surface;
    an inner race disposed within said outer race;
    a bearing assembly disposed between inner and outer races and providing relative rotation therebetween about an axis of rotation; and a circumferentially extending seal coupled to said inner race, said seal including a plurality of lips, each lip having first and second ends, said first ends fixed to said inner race and said second ends engaged with said running surface.

13. The sealing assembly of claim 12, wherein said outer race is generally fixed and said inner race is rotatable relative to said outer race.

14. The sealing assembly of claim 13, wherein each of said first ends of said seal lips forms a hinge, said hinge generally providing for radially outward movement of said second ends relative to said axis of rotation upon rotation of said inner race.

15. The sealing assembly of claim 14, wherein each of said seal lip second ends applies a first force against said running surface when said inner race is not rotating, each of said seal lip second ends applying a second force against said running surface when said inner race is rotating, said second force being generally less than said first force, said lips maintaining contact with said running surface throughout seal operation.

16. The sealing assembly of claim 12, wherein said bearing assembly includes spherical roller bearings.

17. The sealing assembly of claim 12, wherein said inner race includes a bracket extending generally concentric to said running surface, said seal coupled to said bracket.

18. The sealing assembly of claim 17, wherein said running surface extends radially between said bracket and said axis of rotation.

19. The sealing assembly of claim 18, wherein each of said seal lip first ends is coupled to a radially inner surface of said bracket and each of said seal lip second ends engages a radially outer portion of said running surface.

20. The sealing assembly of claim 12, wherein said outer race includes a flange having said running surface at one end and a substantially axially extending cup portion at an opposite end, said cup portion having a reduced diameter at a distal end to engage an undercut formed in said outer race.

* * * * *